(12) United States Patent
Kawabata

(10) Patent No.: US 6,975,885 B2
(45) Date of Patent: Dec. 13, 2005

(54) BASE STATION AND MOBILE BROADCAST COMMUNICATION SYSTEM INCLUDING THE SAME

(75) Inventor: Hisashi Kawabata, Tokyo (JP)

(73) Assignee: NEC Corporation, Tokyo (JP)

( * ) Notice: Subject to any disclaimer, the term of this patent is extended or adjusted under 35 U.S.C. 154(b) by 344 days.

(21) Appl. No.: 10/464,563

(22) Filed: Jun. 19, 2003

(65) Prior Publication Data

US 2004/0137946 A1    Jul. 15, 2004

(30) Foreign Application Priority Data

Jun. 19, 2002    (JP) .............................. 2002-179027

(51) Int. Cl.[7] .............................................. H04Q 1/38
(52) U.S. Cl. .................. 455/561; 455/509; 455/452.2; 370/377; 370/342
(58) Field of Search ............................... 455/561, 509, 455/452.2; 370/337, 342

(56) References Cited

U.S. PATENT DOCUMENTS 6,907,020 B2 * 6/2005 Periyalwar et al. ......... 370/337

| 2001/0033560 | A1 * | 10/2001 | Tong et al. .................. 370/337 |
| 2002/0012334 | A1 * | 1/2002 | Strawczynski et al. ..... 370/337 |
| 2002/0080816 | A1 * | 6/2002 | Spinar et al. ............... 370/449 |
| 2003/0089064 | A1 * | 5/2003 | Faulkner et al. ............. 52/408 |
| 2005/0089064 | A1 * | 4/2005 | Zimmerman et al. ....... 370/468 |

FOREIGN PATENT DOCUMENTS

| JP | 62-67945 A | 3/1987 |
| JP | 6-244844 A | 9/1994 |
| JP | 8-336184 A | 12/1996 |
| JP | 10-135886 A | 5/1998 |
| JP | 10-285108 A | 10/1998 |
| JP | 2000-224648 A | 8/2000 |
| JP | 2001-103080 A | 4/2001 |

* cited by examiner

*Primary Examiner*—Danh Cong Le
(74) *Attorney, Agent, or Firm*—Sughrue Mion, PLLC

(57) ABSTRACT

A mobile broadcast communication system of the present invention includes a broadcast communication station configured to send, in response to a request from a mobile terminal, audio, video or similar broadcast communication data. At this instant, whether or not the receipt quality of the mobile terminal is higher than a reference value is determined. The transmission of the broadcast communication data is effected by assigning a single spread code to a single channel, so that the data can be sent even to a plurality of mobile stations via a single channel at high speed.

5 Claims, 10 Drawing Sheets

Fig. 8

BROADCAST COMMUNICATION SCHEDULE 2002.A.B — 301

| TIME ZONE | CONTENT | ACCESS PHONE NUMBER | FEE(¥) |
|---|---|---|---|
| 10.00~12.00 | CONCERT ××× | 123-456 | 100 |
| 12.00~14.00 | MOVIE ××× | 789-012 | 50 |
| 14.00~15.00 | NEWS | 345-678 | — | ns
BASE STATION AND MOBILE BROADCAST COMMUNICATION SYSTEM INCLUDING THE SAME

BACKGROUND OF THE INVENTION

The present invention relates to a base station capable of sending audio, video or similar data to a plurality of mobile stations by broadcasting and a mobile broadcast communication system including the same.

DESCRIPTION OF THE BACKGROUND ART

Basically, a communication system, including a plurality of mobile terminals, allows a single base station and a single mobile terminal to be connected to and communicate with each other. As for a CDMA (Code Division Multiple Access) system using a spectrum spread technology, a plurality of mobile terminals or users can hold communication by sharing the same frequency band. More specifically, in the CDMA system, signals are spread over the entire frequency band by use of a spread code generally referred to as a PN (Pseudo Noise) code and then sent. A mobile terminal at the receiving side decodes a signal sent from a particular user by using an inverse spread code. Therefore, if a particular spread code is assigned to broadcast communication data and if an inverse spread code inverse to the spread code is set in each mobile terminal, then the mobile terminals with the inverse spread code can receive the broadcast communication data from the base station at the same time. Such a technology is disclosed in, e.g., Japanese Patent Laid-Open Publication Nos. 2000-224648 and 2001-103080.

For example, IMT-2000 (3GPP (3rd Generation Partnership Project), prescribed by ITU-R (International Telecommunication Union-Radio communication group) as an international standard for a digital, portable personal telephone, proposes a broadcast server using SCPCH (Secondary Common Control Physical Channel) in its "3GPPTR 25.925". This proposal, however, pertains to low-speed broadcast transmission services and cannot deal with high-speed data. Moreover, when data to be dealt with is video data, the above proposal results in the transmission of a deteriorated, low-quality image.

Today, functions available with portable personal telephones and other mobile terminals are advancing and have allowed them to interchange even movies. 3GPP mentioned above proposes an HSDPA (High-speed Downlink Packet Access) mode capable of increasing the frequency band of a downlink channel up to 10 Mbps (megabits per second) to meet the increasing demand for such a frequency band. Further, HS-DSCH (High Speed Downlink Shared Channel) is studied in "3GPPTR25.858" as a channel applicable to the HSDPA mode and specified in TS25.211-214.

However, the problem with HS-DSCH is that a plurality of users share a high-speed downlink on a time division basis, i.e., each mobile terminal occupies a particular divided unit of a downlink. This limits the transfer capacity of available with a single radio base station. Consequently, when HS-DSCH is used in an environment in which mobile terminals are densely packed in a single base station, the base station cannot send downlink high-speed data to all of the mobile terminals sharing the same downlink channel.

Technologies relating to the present invention are also disclosed in, e.g., Japanese Patent Laid-Open Publication Nos. 62-067945, 08-336184, 06-244844, 10-135886 and 10-285108.

SUMMARY OF THE INVENTION

It is an object of the present invention to provide a base station capable of sending high-speed data without regard to the number of mobile terminals and a mobile broadcast communication system.

BRIEF DESCRIPTION OF THE DRAWINGS

The above and other objects, features and advantages of the present invention will become more apparent from the following detailed description taken with the accompanying drawings in which:

FIG. 8 shows specific contents of a home page included in the modification;

DESCRIPTION OF THE PREFERRED EMBODIMENT

Figure 1:
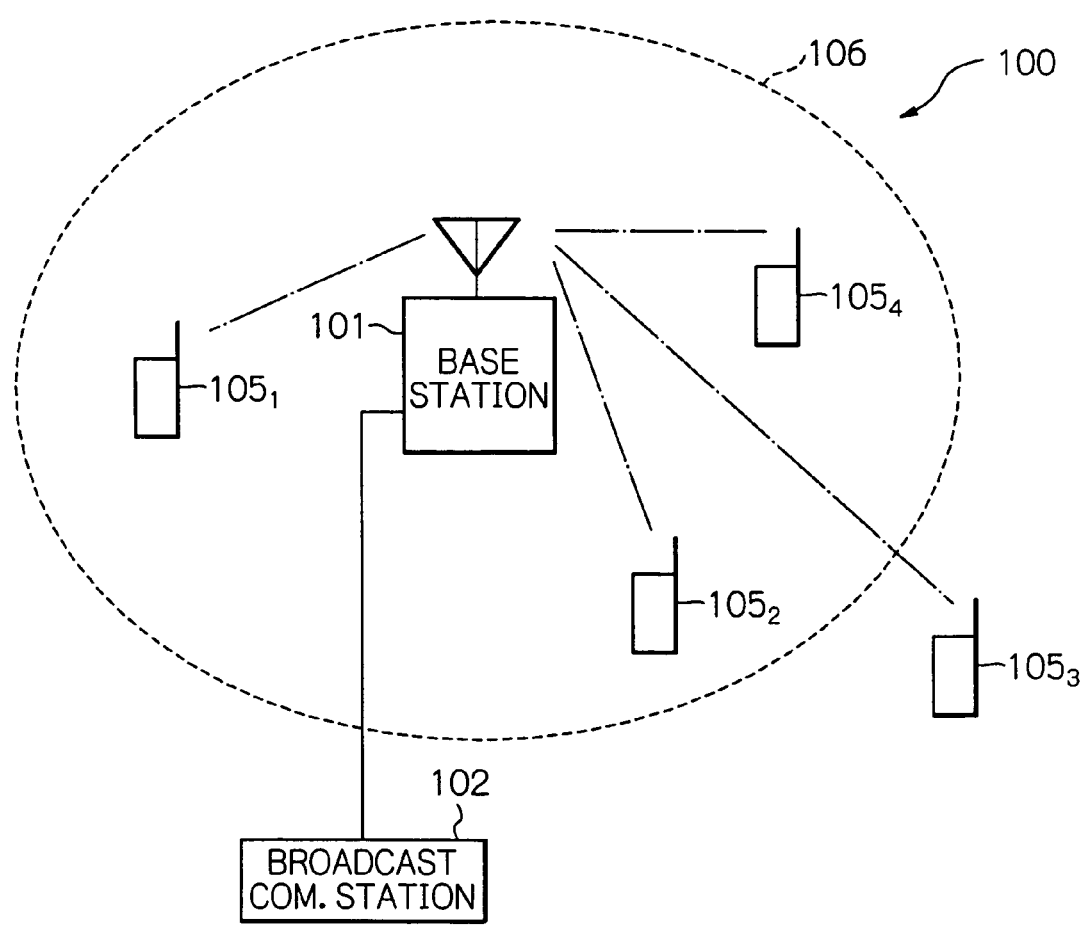
FIG. 1 shows a mobile broadcast communication system including a base station embodying the present invention.

Referring to FIG. 1 of the drawings, a mobile, broadcast communication system using a base station embodying the present invention is shown and generally designated by the reference numeral 100. As shown, the communication system 100 includes a base station 101 and a particular broadcast communication station (BROADCAST COM. ST.) 102. A first to a fourth mobile terminal $105_1$ through $105_4$, which are representative of a plurality of mobile stations, are located around the base station 101. The first, second and fourth mobile terminals $105_1$, $105_2$ and $105_4$ are assumed to be positioned in a single cell or area 106 and capable of communicating with the base station 101.

The base station 101 executes communication based on a DS-CD (Direct Spread-Code Division Multiple Access) system. In the illustrative embodiment, during such communication, the base station 101 varies the frame format of a broadcast communication channel in accordance with the condition of downlink communication. For example, when a broadcast communication channel on which large-capacity communication is to be held from a given time to another time in the downlink direction exists, the base station 101 matches the frame format to such a condition.

Figure 2:
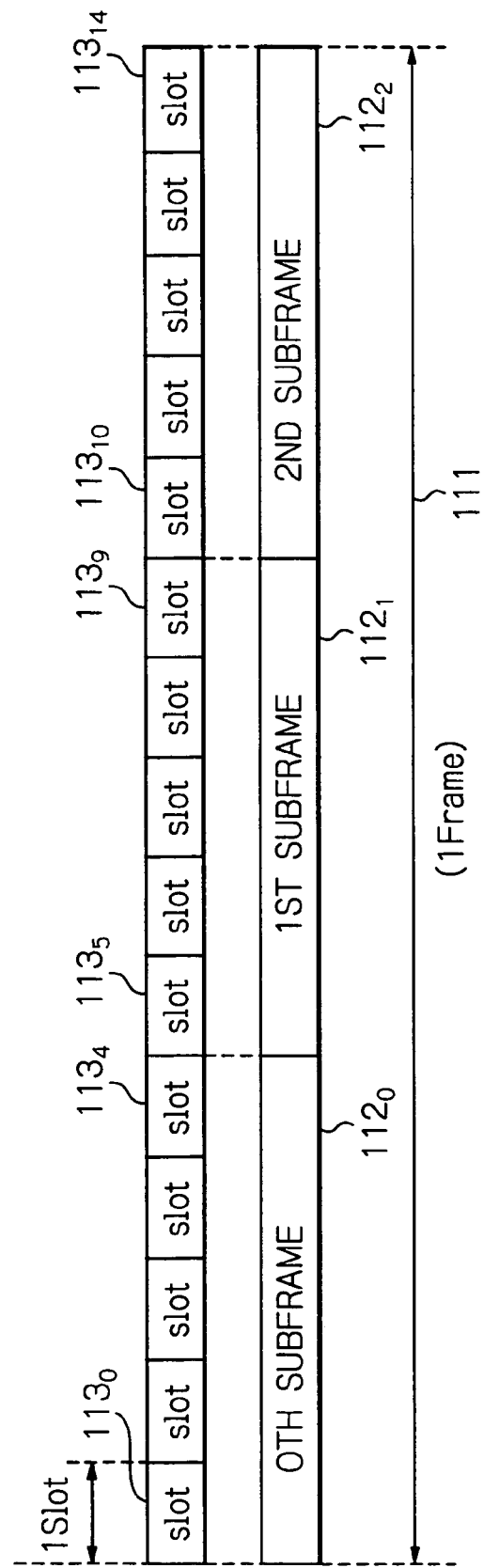
FIG. 2 shows a specific frame format unique to the illustrative embodiment and representative of broadcast communication channels at a given time.

FIG. 2 shows a specific frame format of a broadcast communication channel at a preselected time unique to the illustrative embodiment. As shown, one frame 111 of a downlink high-speed channel is divided into three subframes $112_0$ through $112_2$. The number of subframes 112 into which the frame 111 should be divided is open to choice and dependent on capacity necessary for a broadcast communication channel for a unit time. In this respect, the frame format of FIG. 2 indicates that the maximum number of existing broadcast communication channels is three. The zeroth subframe $112_0$ is made up of a zeroth to a fourth slot $113_0$ through $113_4$ while the first subframe $112_1$ is made up of a fifth to a ninth slot $113_5$ through $113_9$. Likewise, the second subframe $112_2$ is made up of a tenth to a fourteenth slot $113_{10}$ through $113_{14}$. While the same number of slots are shown as being allotted to all of the subframes $112_0$ through $112_2$, the allotment of slots may be suitably varied in accordance with the capacity of the individual broadcast communication channel.

As stated above, a single frame 111 is divided into the zeroth to second subframes 1120 through 1122, so that the base station 101 can accommodate up to three broadcast communication channels at the same time within the same time zone. It is noteworthy that such broadcast communication channels can send downlink broadcast data to the mobile terminals 105, which lie in the same cell 106, without limiting the number of the mobile terminals 105. Therefore, the communication system 100, configured to send the same data to all of the mobile terminals 105 by broadcasting, is far more efficient than a communication system that separately sends the same data to the individual mobile stations 105.

Figure 3:
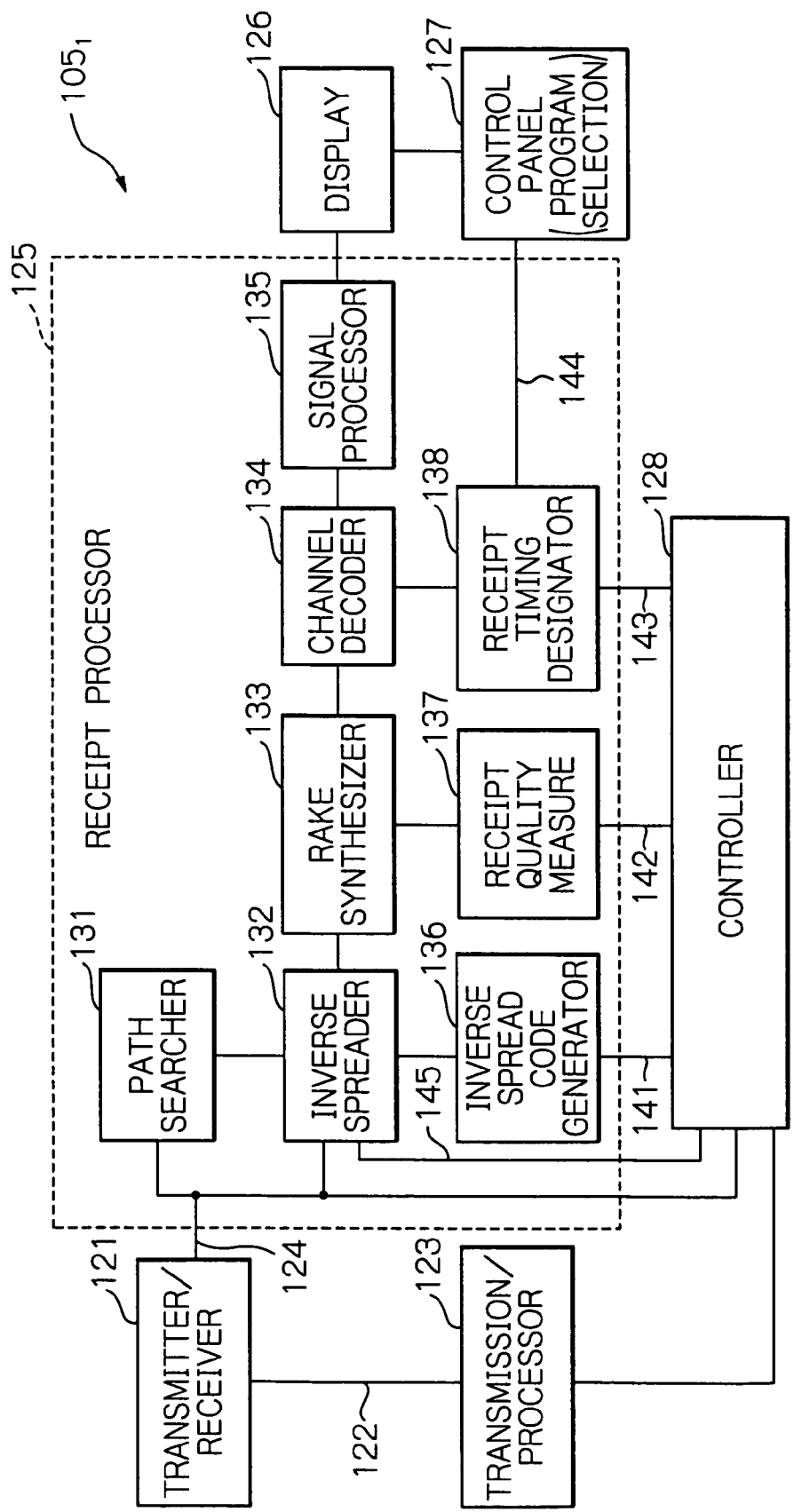
FIG. 3 is a schematic block diagram showing a specific configuration of a mobile terminal included in the system of FIG. 1.

A specific configuration of the first mobile terminal $105_1$ will be described with reference to FIG. 3. The second to fourth mobile terminals $105_2$ through $105_4$ are identical in configuration with the first mobile terminal $105_1$ and will not be described specifically in order to avoid redundancy. As shown, the mobile terminal $105_1$ includes a radio transmitter/receiver 121 connected to an antenna not shown. A transmission processor 123 for outputting data 122 to be sent and a receipt processor 125 for processing received data 124 are connected to the transmitter/receiver 121. The receipt processor 125 is connected to a display 126 for displaying the content of received data 124 and other preselected information and a control panel 127 for allowing the user of the mobile terminal $105_1$ to input various kinds of information. The display 126 and control panel 127 may be connected to the transmission processor 123 as well, if desired. The transmission processor 123 and receipt processor 125 operate under the control of a controller 128. The controller 128 includes a CPU (Central Processing Unit), not shown, and executes a control program stored in a memory, not shown, for thereby controlling, e.g., communication with the base station 101.

The receipt processor 125 includes a path searcher 131 configured to search for a delayed wave included in the received data 124, which is input to the receipt processor 125. An inverse spreader 132 decodes the received data 124 by use of an inverse spread code with every path searched for by the path searcher 131. A rake synthesizer 133 synthesizes a rake for each path while a channel decoder 134, which follows the rake synthesizer 133, selects the received data of a desired channel. The received data so selected is input to a signal processor 135 to be subjected to necessary signal processing and then fed to the display 126.

The receipt processor 125 further includes an inverse spread code generator 136, a receipt quality measure 137 assigned to broadcast channels, and a receipt timing designator 138 also assigned to broadcast channels. The inverse spread code generator 136 generates an inverse spread code designated by inverse spread code information 141 received from the controller 128 and feeds the code to the inverse spreader 132. The receipt quality measure 137 determines whether or not the quality of the synthesized signal output from the rake synthesizer 133 is acceptable. In the illustrative embodiment, a plurality of mobile terminals 105 are expected to reproduce broadcast data that the base station 101 sends with the same transmission power, as stated earlier. The receipt quality measure 137 therefore determines, based on the receipt level, whether or not the mobile terminal 105, can adequately receive the broadcast data. The result of quality measurement 142 is fed from the receipt quality measure 137 to the controller 128. The controller 128 delivers the result of quality measurement 142 to the transmission processor 123, thereby reporting the result of measurement to the base station 101.

If the result of quality measurement 142 sent to the base station 101 is indicative of adequate reproduction of broadcast data, then the base station 101 returns a broadcast channel subframe format 143 to the controller 128. The broadcast channel subframe format 143 is fed from the controller 128 to the receipt timing designator 138. In response, the receipt timing designator 138 feeds the subframe of a broadcast communication channel desired by the user to the channel decoder 134 in accordance with subframe selection information input on the control panel 127.

On receiving the subframe from the receipt timing designator 138, the channel decoder 134 selects, e.g., the broadcast communication channel of the zeroth subframe $112_0$, FIG. 2, and then decodes data belonging to the above channel. If the data of the channel thus selected is compressed movie data, then the signal processor 135 expands the data to thereby reproduce a movie. It is to be noted that the controller 128 delivers slot format information 145 representative of the format of time slots to the inverse spreader 132.

Figure 4:
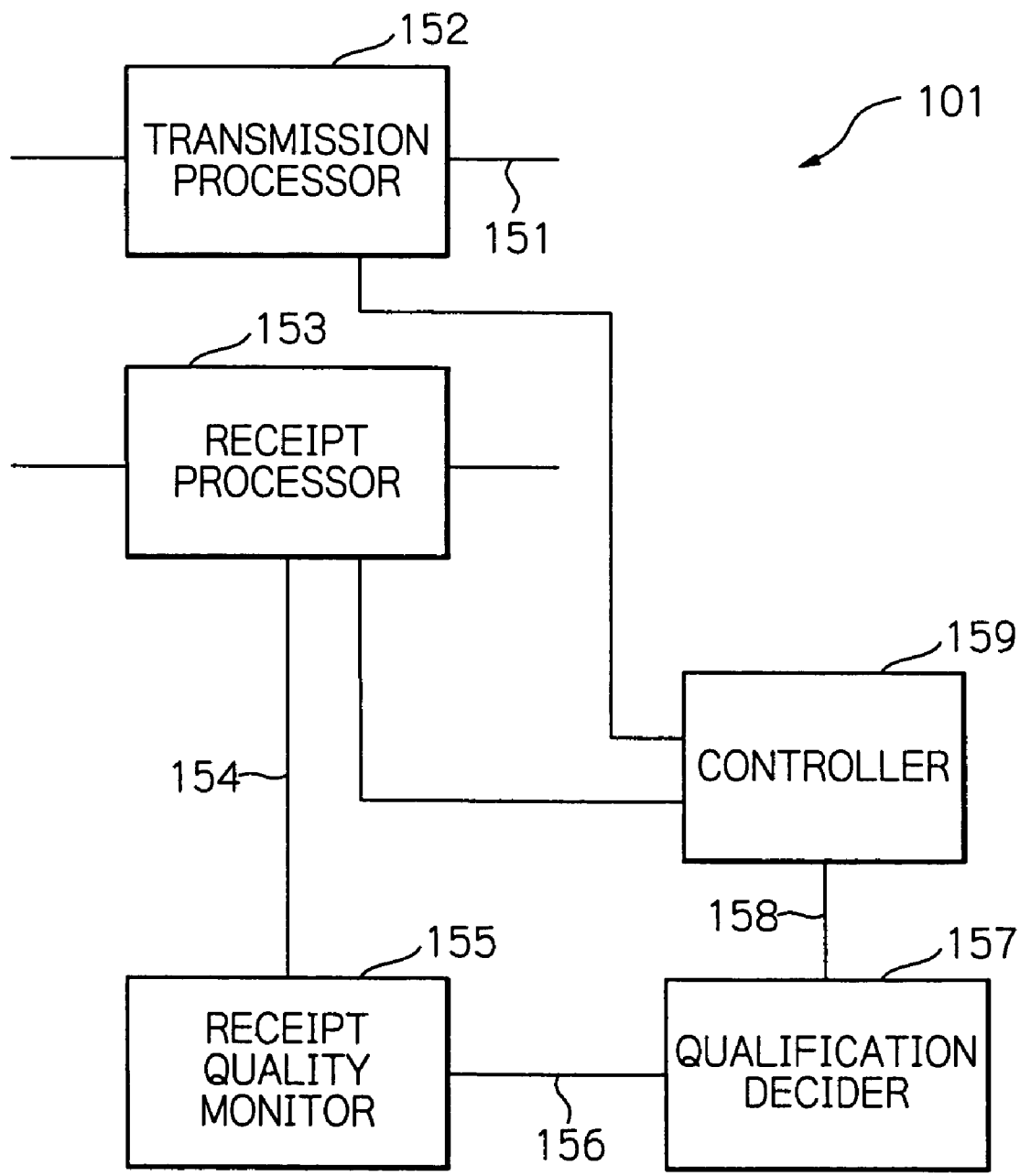
FIG. 4 is a block diagram schematically showing a specific configuration of a base station also included in the system of FIG. 1.

FIG. 4 shows a specific configuration of the base station 101. As shown, the base station 101 includes a transmission processor 152 configured to execute transmission processing with broadcast data 151 input thereto and send the resulting data via an antenna not shown. A receipt processor 153 receives data sent from any one of the mobile terminals 105 each having the configuration of FIG. 3. The receipt processor 153 feeds receipt quality data 154 representative of, among the received data, the result of quality measurement 142, FIG. 3, to a channel receipt quality monitor 155. The channel receipt quality monitor 155 decodes the receipt quality data 154 and feeds the decoded data 156 to a qualification decider 157. The qualification decider 157 determines whether or not the individual mobile station 105 is qualified to join in the broadcast service. The result of decision 158 output from the qualification decider 157 is input to a controller 159, which controls the entire base station 101. To execute control matching with the result of decision 158, the controller 159 includes a CPU and a memory, not shown, and executes a control program stored in the memory for thereby controlling the transmission processor 152 and receipt processor 153.

Figure 5:
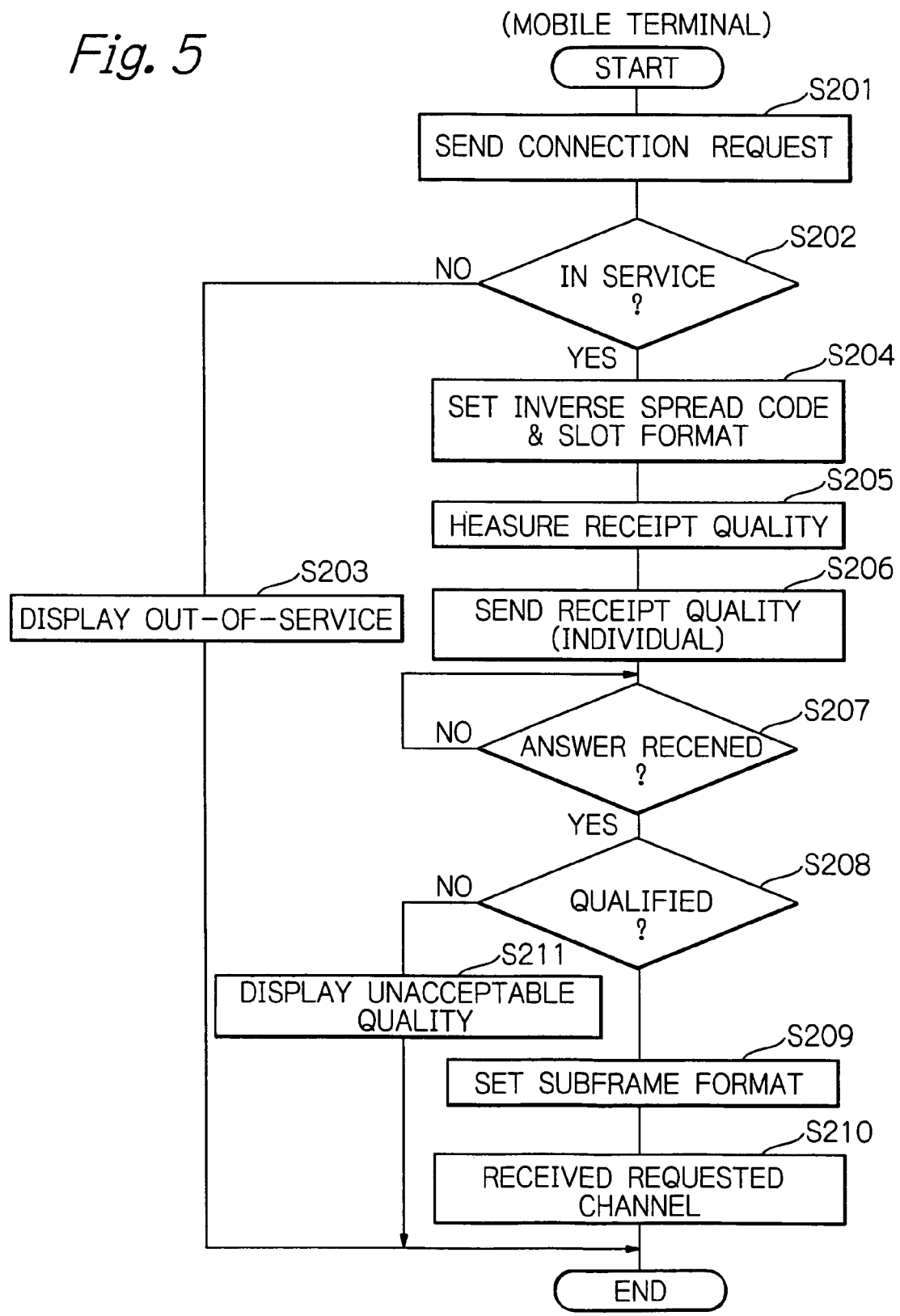
FIG. 5 is a flowchart demonstrating a specific operation of the mobile terminal.
Figure 6:
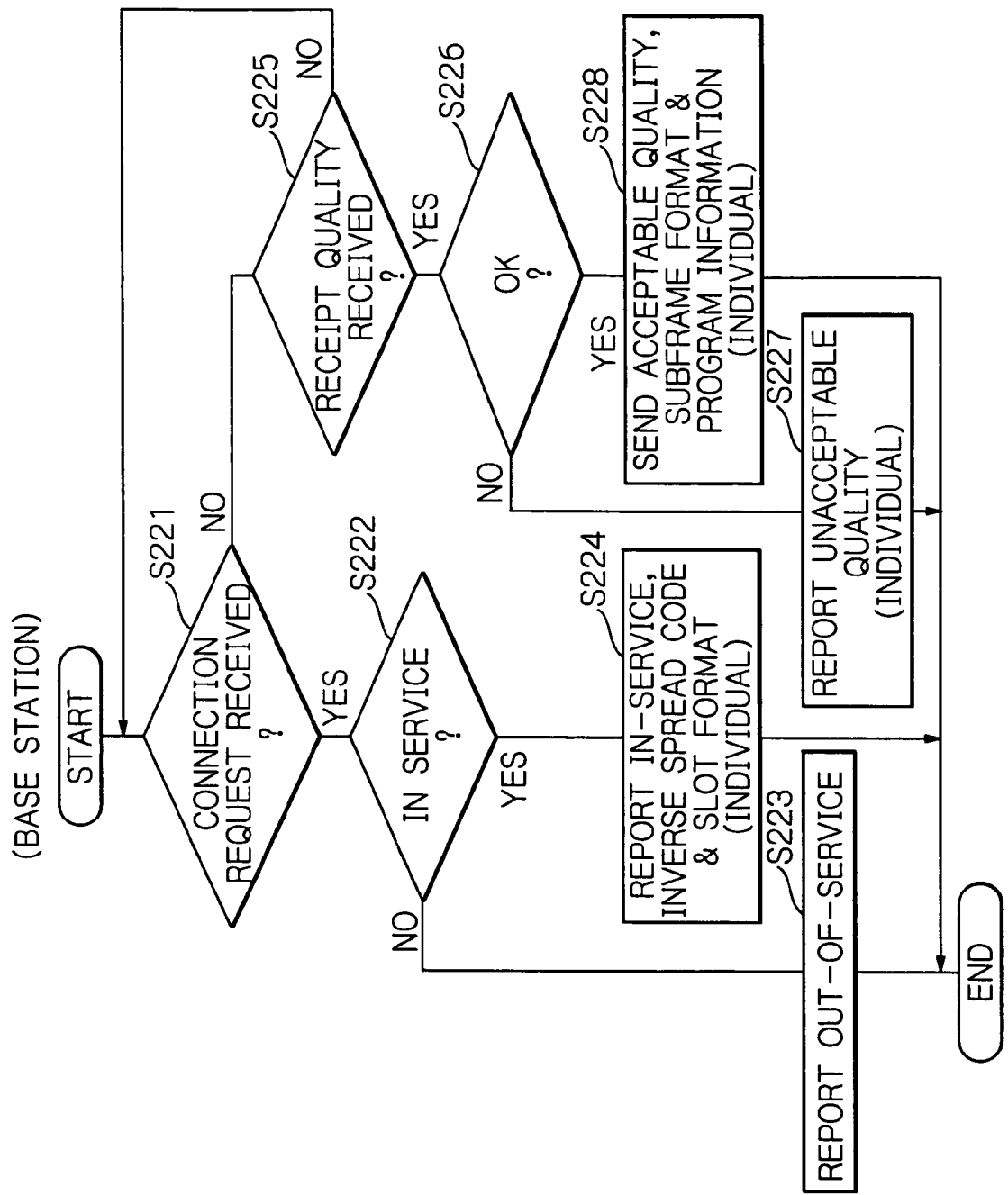
FIG. 6 is a flowchart demonstrating a specific operation of the base station.

FIG. 5 demonstrates a specific procedure to be executed by the mobile station for receiving a free, broadcast communication channel. FIG. 6 shows a specific procedure to be executed by the base station in relation to the procedure of FIG. 5. Assume that the user of a mobile station $105_X$, corresponding to any one of the mobile terminals $105_1$ through $105_4$ shown in FIG. 1, sees the content of broadcast communication to receive by accessing the home page of the broadcast communication station 102 or newspaper, magazine or similar information source and then sends a broadcast communication channel connection request to the base station 101 (step S201, FIG. 5). For this purpose, the user accesses, via the base station 101, a telephone number assigned to the broadcast communication station 102 beforehand.

On receiving the above communication request (YES, step S221, FIG. 6), the base station 101 determines whether or not any broadcast service is currently available (step S222). If the answer of the step S222 is negative (NO), then the base station 101 sends an answer to the access to the telephone number to the mobile station $105_X$, showing that no broadcast services are currently available (step S223). The base station 101 then ends the individual access processing (END).

On the other hand, the mobile station $105_X$, executed the step S201 of FIG. 5, is waiting for the answer showing whether or not any broadcast service is available, from the base station 101. When the base station 101 executes the step S223, FIG. 6, the mobile station $105_X$ sees that no broadcast services are currently available. In this case, an out-of-service message, e.g., "No broadcast services are available now. Please call us again at right time." appears on the display 126, FIG. 3, (step S203). The procedure ends (END) after the step S203.

Assume that any communication service is available at the time when the connection request is sent from the mobile terminal $105_X$ to the base station 101 (YES, step S222, FIG. 6). Then, the base station 101 sends an answer to the access to the telephone number and including information, which shows that broadcast services are available, and an inverse spread code and a slot format assigned to the broadcast communication channel frame 111, FIG. 2, (step S224). The procedure then ends (END).

In response to the answer sent in the above step S224 (YES, step S202, FIG. 5), the mobile terminal $105_X$ sets the inverse spread code and slot format included in the answer in itself (step S204). At this stage of procedure, the mobile terminal $105_X$ cannot receive the desired broadcast communication channel because it has not received the format of subchannels each corresponding to a particular receipt channel. However, by setting the inverse spread code, the mobile terminal $105_X$ can receive broadcast communications being sent from the base station 101. Subsequently, in the mobile terminal $105_X$, the receipt quality measure 137, FIG. 3, measures the receipt quality of the broadcast channel on the basis of decoded data (step S205) and then returns the result of measurement to the base station 101 via the individual channel, which uses the current telephone number, (step S206).

The base station 101 waits for the answer representative of receipt quality from the base station $105_X$ while waiting for the connection request of the step S221 (step S225, FIG. 6). On receiving the above answer (YES, step S225), the base station 101 analyzes the result of quality measurement to thereby determine whether or not the mobile station $105_X$ can receive broadcast data with quality higher than a preselected value (step S226).

The communication system 100 of the illustrative embodiment differs from the conventional communication system, which connects the base station 101 to a single mobile station 105 at a time, in that the system 100 connects the base station 101 to a plurality of scattered mobile stations at the same time. With the conventional communication system, it is possible to guarantee an optimum communication level for the mobile terminal 105 if the base station 101 controls downlink transmission power to the mobile terminal 105. By contrast, the communication system 100 does not allow the base station 101 to control transmission power to the individual mobile terminal 105. To solve this problem, the illustrative embodiment causes the base station 101 to send broadcast data with preselected, fixed transmission power and causes the individual mobile terminal 105 to return an answer representative of receipt quality thereof to the base station 101, as stated above. The base station 101 does not allow any one of the mobile terminals 105 whose receipt quality is lower than the preselected value to receive broadcast communication channels.

For example, in FIG. 1, the probability that the fourth mobile station $105_4$ relatively close to the base station 101 has receipt quality higher than the preselected value is high. On the other hand, it is difficult for the third mobile terminal $15_3$ outside the cell 106 to attain receipt quality higher than the preselected value. This is also true with the first or the second mobile terminal 1051 and 1052, depending on the transmission power set beforehand.

If the result of quality measurement received from the mobile terminal $105_X$ is short of the preselected value (NO, step S226, FIG. 6), then the base station 101 sends an answer, showing that the receipt quality is unacceptable, to the mobile station $105_X$ (step S227). If the answer of the step S226 is YES, then the base station 101 sends an answer, including information showing that the receipt quality is acceptable, a subframe format for allowing the mobile station $105_X$ to select and receive a desired channel and service program information, to the mobile terminal $105_X$ (step S228). The steps S227 and S228 are executed via the individual channel using the current telephone number.

After sending the receipt quality (step S206, FIG. 5), the mobile terminal $105_X$ waits for the answer relating to the receipt quality from the base station 101 (step S207) If the answer from the base station 101 shows that the receipt quality is acceptable (YES, step S207 and YES, step S208), then the mobile terminal $105_X$ sets the subframe format in itself (step S209). Thereafter, the mobile station $105_X$ ends the individual communication, selects the desired broadcast communication channel, and then receives the desired channel (step S210). It is to be noted that the mobile station $105_X$ can receive not only a movie but also music, program file or similar relatively large amount of data.

If the receipt quality determined by the base station 101 is not acceptable (NO, step S208), then the mobile station $105_X$ displays on the display 126 a message showing the user that the receipt quality is too low to receive the desired broadcast communication service (step S211), and then ends the procedure (END). In this case, the user may move the mobile terminal 105X to a position closer to the base station 101 and again try the step S201.

In the illustrative embodiment, the communication system 100 is not configured such that the mobile terminals 1051 through 1054 are individually charged for the broadcast communication channels, which are sent from the broadcast communication station 102 via the downlink channel of the base station 101 for high-speed communication. For this kind of communication system, each broadcast communication channel may be sponsored for advertising revenue. Alternatively, a membership system, including users expected to use the broadcast communication channels, may be organized, in which case each user will be required to input a password and a user's name when accessing the base station 101 or the broadcast communication station 102 and pay a membership fee.

Figure 7:
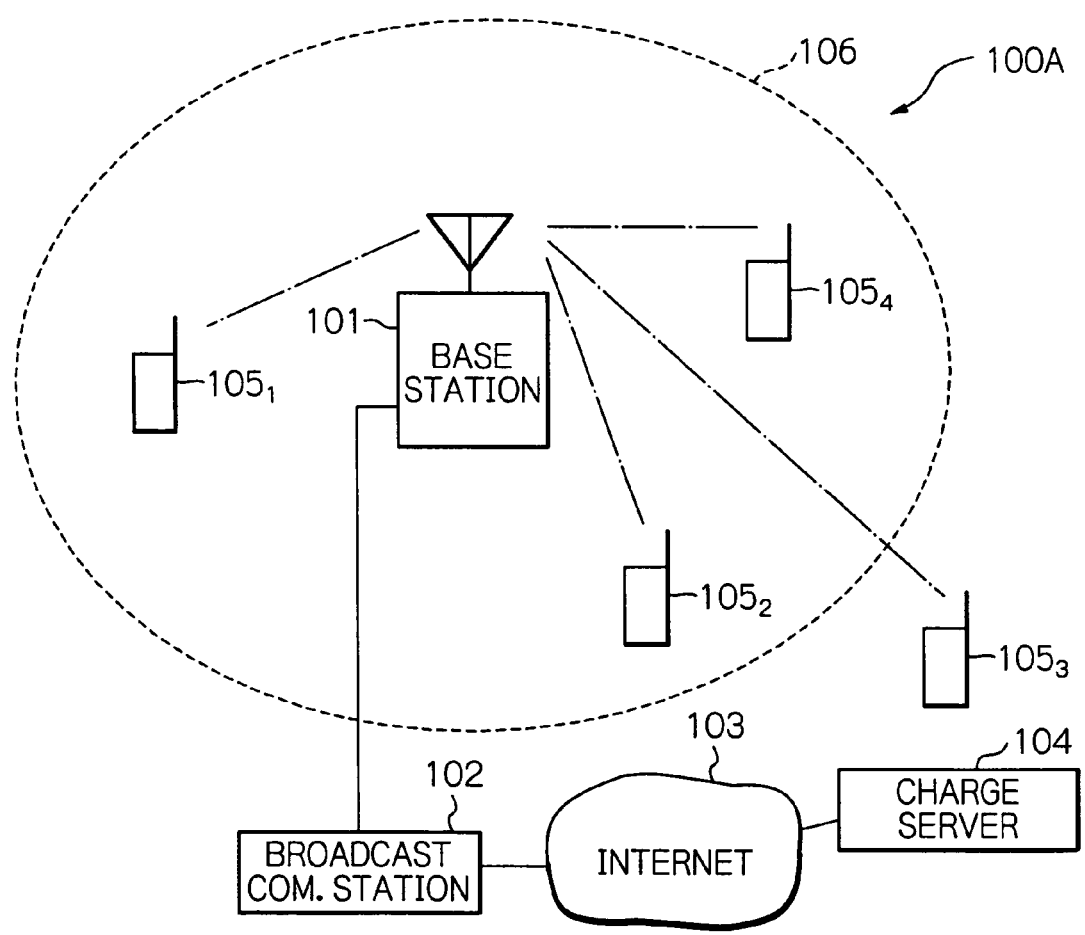
FIG. 7 shows a modification of the illustrative embodiment.

Reference will be made to FIG. 7 for describing a modification of the illustrative embodiment. In FIG. 7, portions identical with the portions of FIG. 1 are designated by identical reference numerals and will not be described specifically in order to avoid redundancy. As shown, the communication system, labeled 100A, is connected to a charge server 104 via Internet 103, which opens the broadcast communication schedule of the broadcast communication station 102 to the public on its home page. The charge server 104 charges each of the mobile terminals $105_1$, through $105_4$ every time the mobile station receives a broadcast service.

FIG. 8 shows specific contents listed on the home page of Internet 103. As shown, the broadcast communication station 102 opens the broadcast communication schedule of, e.g., the day or the week to the public on a home page 301. The user of the mobile terminal $105_X$ can therefore connect the terminal $105_X$ to Internet 103 to see the home page 301 and see if desired broadcast communication data exists or not.

Figure 9:
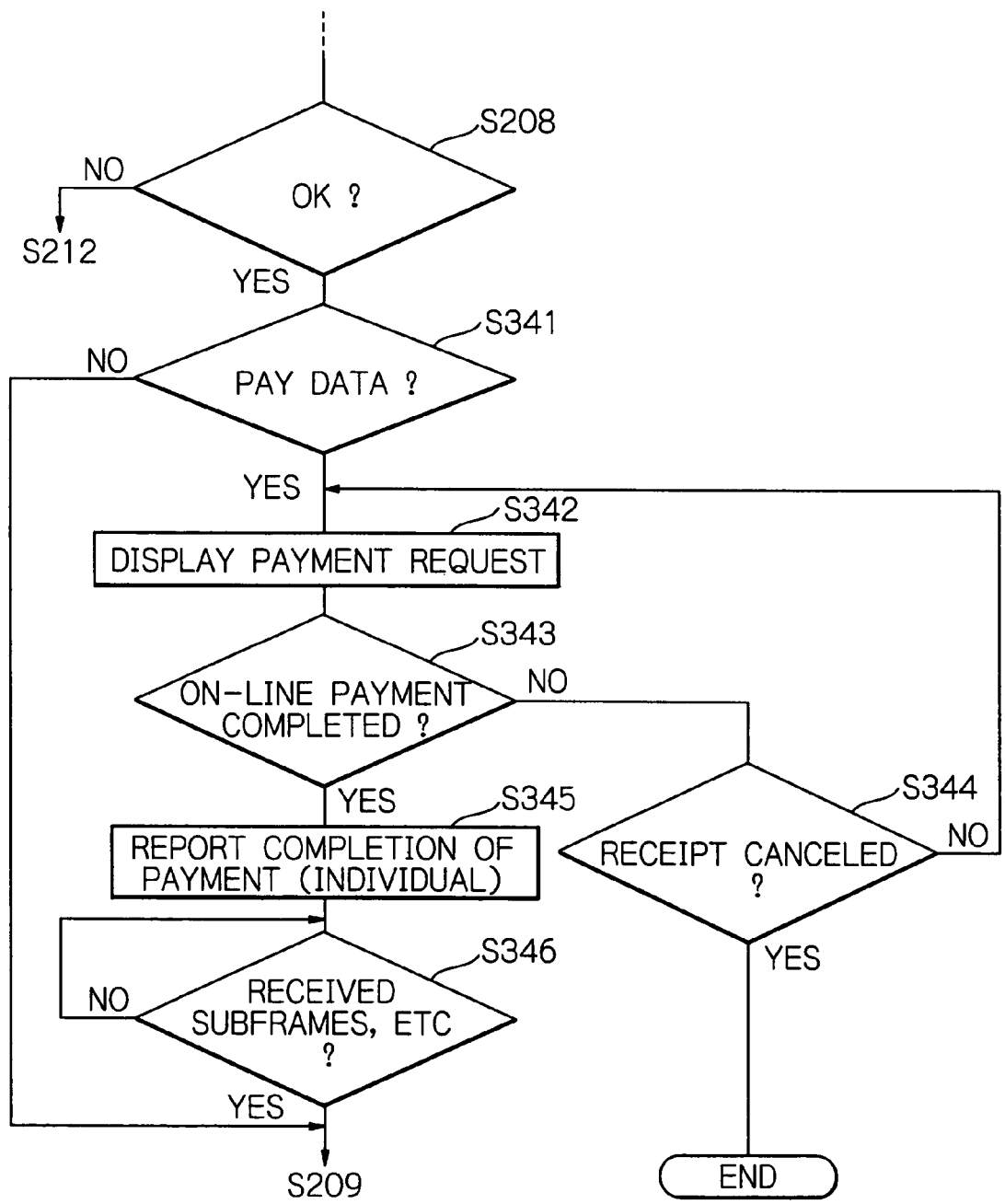
FIG. 9 is a flowchart showing part of a specific operation of the mobile terminal included in the modification.
Figure 10:
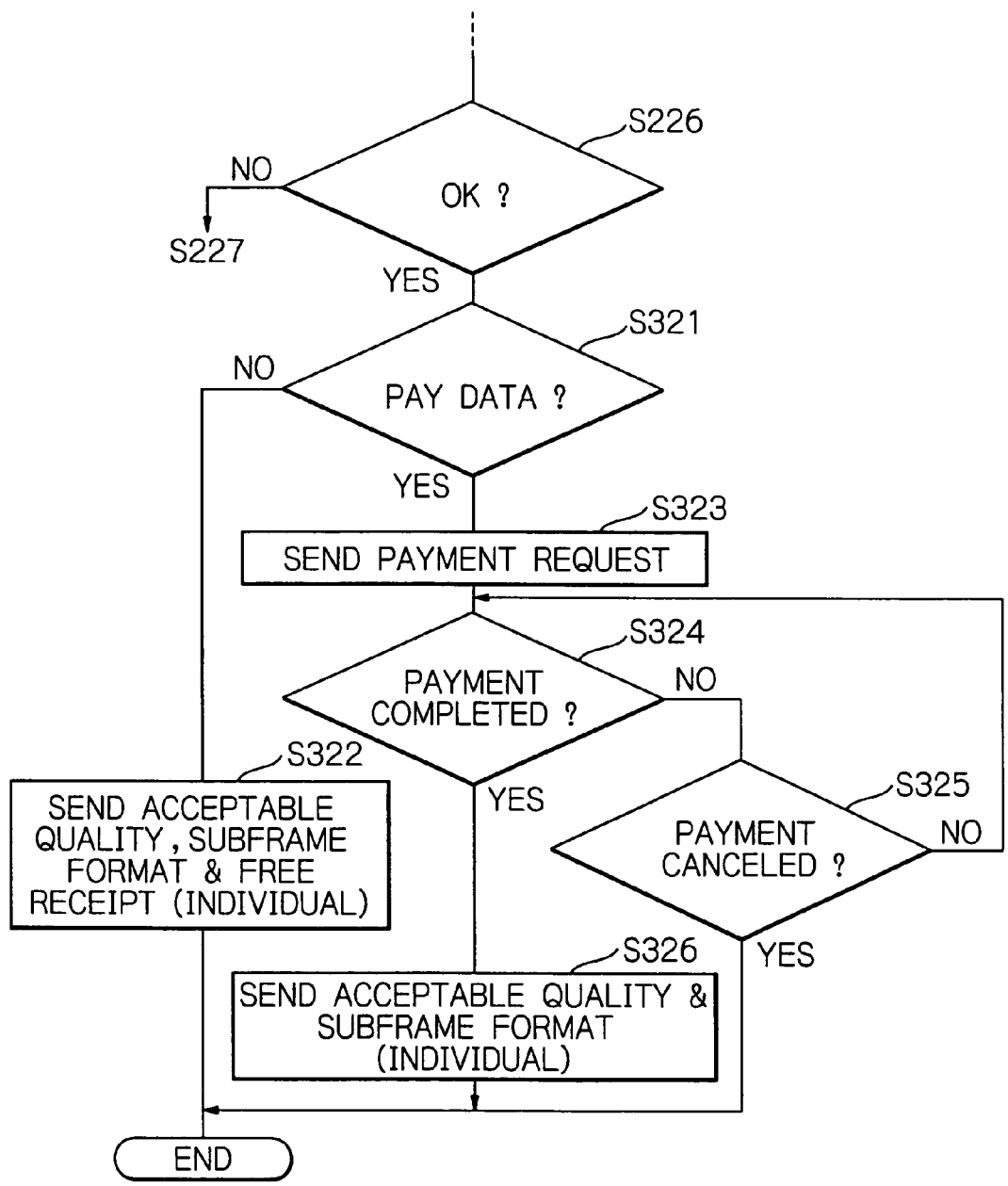
FIG. 10 is a flowchart showing part of a specific operation of the base station included in the modification.

FIG. 9 shows processing particular to the modification and following the step S208 of FIG. 5 while FIG. 10 shows a procedure also particular to the modification and following the step S226 of FIG. 6. The other part of the processing is identical with the processing of FIGS. 5 and 6 and will not described specifically. As shown, when the base station 101 determines that the receipt quality of the mobile terminal $105_x$ is acceptable (YES, step S226), the base station 101 determines whether or not the broadcast communication data to be sent is pay data (step S321). If the answer of the step S321 is NO, e.g., if the desired broadcast communication data is a news in the time zone between 14.00 and 15.00 shown in FIG. 8, then the base station 101 executes a step S322. In the step S322, the base station 101 notifies the mobile station $105_X$ that the receipt quality is acceptable and that the receipt itself is free, while sending the subframe format to the mobile station 105X.

If the answer of the step S321 is NO, e.g., if the desired broadcast communication data is a movie in the time zone between 12.00 and 14.00 shown in FIG. 8, then the base station 101 sends a payment request to the mobile terminal $105_X$ (step S323). Subsequently, the base station 101 determines whether or not it has received information indicative of the completion of payment from the mobile station $105_X$ (step S324) or whether or not payment or receipt contact itself has been canceled (step S325). If the answer of the step S325 is YES, then the base station 101 ends the processing immediately. If the answer of the step S324 is YES, then the base station 101 reports the mobile station $105_X$ that the receipt quality is acceptable, while sending the subframe format to the mobile terminal $105_X$ (step S326).

On the other hand, as shown in FIG. 9, when the receipt quality is acceptable (YES, step S208), the mobile terminal $105_X$ analyzes the data sent from the base station 101 in the step S322 of FIG. 10 to see if the desired broadcast communication data is pay data or not (step S341). If the answer of the step S341 is NO, then the mobile station $105_X$ executes a step S209 immediately, i.e., sets the subframe format in itself as in the procedure of FIG. 5. Subsequently, the mobile terminal $105_X$ ends the individual communication, selects the desired broadcast communication channel, and then receives the desired channel (step S210).

If the answer of the step S341 of FIG. 9 is YES, meaning that the desired broadcast communication data is pay data, then the mobile terminal $105_X$ displays on the display 126 a message requesting the user to pay for the data (step S342). The mobile terminal $105_X$ determines whether or not the user has completed on-line payment (step S343) or whether or not the user has canceled the receipt of the data (step S344). If the answer of the step S344 is YES, then the mobile station $105_X$ ends the processing (END).

If the answer of the step S343 is YES, then the mobile station $105_X$ reports the end of on-line payment to the base station (step S345). Subsequently, on receiving the information sent from the base station 101 in the step S326 of FIG. 10 (step S346), the mobile station $105_X$ executes the step S209 for setting the subframe format in itself, ends the individual receipt, and then selects and receives the desired broadcast communication channel (step S210, FIG. 5).

While the illustrative embodiment shown and described multiplies a plurality of channels by time division by using a subframe format, such a subframe scheme is only illustrative. Alternatively, a multicode technology, which sends a plurality of code channels having the same spread ratio by multiplying them, may be used to send a plurality of channels of programs or data, in which case the mobile terminal will selectively receive the channels.

Further, the illustrative embodiment and modification thereof each determine whether or not the mobile terminal is qualified on the basis of the receipt quality of the mobile terminal. Alternatively, a distance to the mobile terminal may be determined on the basis of the delay profile of the individual channel, in which case receipt quality of the mobile terminal will be estimated on the basis of the distance.

In summary, it will be seen that the present invention provides a base station and a mobile broadcast communication system having various unprecedented advantages, as enumerated below.

(1) A base station sends broadcast communication data via a high-speed downlink channel by spectrum spread effected with a particular spread code assigned to the same frequency band. Therefore, even when a number of mobile terminals exist in a single cell or area, a single subframe should only be allotted to the mobile stations, so that extremely efficient communication is achievable.

(2) When receipt quality of a given mobile terminal, determined by receipt quality determining means, is higher than a reference value, the mobile terminal is allowed to receive broadcast communication data. Therefore, the base station can be provided with a fixed transmission level, simplifying transmission control.

(3) When subframe format notifying means included in the base station sends a subframe format to a given mobile station, a charging device charges the user of the mobile station for the receipt of broadcast communication data. This successfully enriches video and other data to be dealt with by broadcast communication data.

(4) The communication system includes a server for opening the contents of broadcast communications to the public, so that each mobile terminal can easily see the above contents by accessing the server. Further, the server differs from, e.g., printings in that it can easily notify the user of special programs or the change of programs.

Various modifications will become possible for those skilled in the art after receiving the teachings of the present disclosure without departing from the scope thereof.

What is claimed is:

1. A mobile broadcast communication system comprising:
a base station comprising broadcast communication data sending means for dividing a frame of a signal to be sent via a high-speed downlink channel into a plurality of subchannels, allotting each of broadcast communication data of different channels for broadcast communication to a particular subframe, executing spectrum spread with said broadcast communication data in a single frequency band by using a particular spread code, and sending said broadcast communicated data subjected to spectrum spread, receipt quality determining means for sending the broadcast communication data output from said broadcast communication data sending means to a particular receiving station, which desires to receive the broadcast communication data belonging to one of said subframes, causing said receiving station to decode said broadcast communication data by using an inverse spread code inverse to said spread code, and then determining receipt quality of said receiving station, and subframe format notifying means for notifying, if receipt quality determined by said receipt quality determining means is higher than a reference value set in said receiving station beforehand, said receiving station of a format of the subframe necessary for decoding the broadcast communication data desired by said receiving station; and a mobile terminal comprising connection requesting means for requesting, when said mobile terminal desires to receive the broadcast communication data belonging to the one subframe, said base station to send said broadcast communication data, receipt quality data sending means for decoding, on receiving from said base station the inverse spread code and a frame of a signal sent via the high-speed downlink channel as an answer to a connection request, a signal received from said base station by using said inverse spread code and said frame of said signal and then sending a result of decoding meant for said receipt quality determining means to said base station, and decoding means for selecting, on receiving the format of the subframe from said subframe format notifying means of said base station, the desired subframe and then decoding the broadcast communication data of the channel by using said inverse spread code.

2. The system as claimed in claim 1, further comprising a charging device configured to charge, when said subframe format notifying means of said base station sends the subframe format to said mobile terminal, said mobile terminal for receipt of the broadcast communication data.

3. The system as claimed in claim 1, further comprising a server configured to open at least particular contents of communication and a communication time zone assigned to each broadcast communication channel to the public.

4. The system as claimed in claim 1, wherein said receipt quality determining means determines the receipt quality on the basis of a receipt level of the broadcast communication data received by said mobile terminal.

5. The system as claimed in claim 1, wherein said receipt quality determining means determines a distance to said mobile terminal on the basis of a delay profile of an individual channel occupied by said mobile terminal, and then determines the receipt quality on the basis of said distance.

* * * * *